United States Patent Office 3,288,256
Patented Nov. 29, 1966

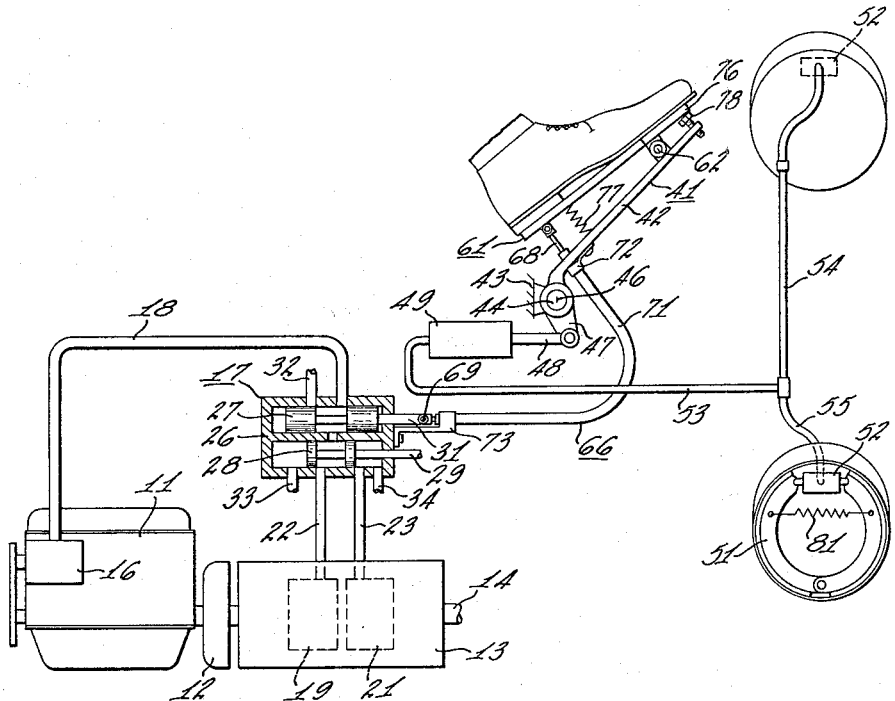

3,288,256
INCHING AND BRAKING CONTROL FOR MOTOR VEHICLES
David W. Dandro, Burlington, Iowa, assignor to Allis-Chalmers Manufacturing Company, Milwaukee, Wis.
Filed Nov. 10, 1964, Ser. No. 410,158
1 Claim. (Cl. 192—13)

This invention relates to interrelated clutch and brake controls for motor vehicles. More particularly this invention relates to an improved inching and braking control having improved operational characteristics.

Heretofore inching and braking controls have been provided for various motor vehicles such as lift trucks and the like. One such system utilizes an inching pedal and a vehicle braking pedal wherein the braking pedal may be operated independently of the inching pedal and the inching pedal operates a clutch control valve upon initial depression and picks up the brake pedal by an overlapping part upon further depression thereof. This system has met with some success, however, it is not entirely satisfactory. An important deficiency in such inching and braking control is that it is necessary to adjust the interengagement between the inching pedal and braking pedal as the clutch and brake facings wear, in order to provide the proper overlap between clutching and braking operations. Another shortcoming is that the prior art inching control does not readily permit the operator to select the degree of overlap between clutching and braking functions.

It is an object of this invention to provide a combined inching and braking control wherein the operator may select the desired degree of overlap between clutching and braking functions by merely rocking his foot about his ankle.

It is a further object of this invention to provide an inching and braking control mechanism which includes a first pedal part which may be engaged by the left foot of the operator for combined or independent inching and braking operations and a second pedal part which may be engaged by the operator's right foot and upon engagement will only effect braking.

It is a further object of this invention to provide an improved control of inching and braking functions in a motor vehicle which is relatively simple in construction, thereby permitting low manufacturing costs.

It is a further object of this invention to provide an inching and braking control mechanism which does not require adjustment to compensate for clutch and brake wear.

These and other objects of this invention will be apparent when the following description is read in conjunction with the drawings in which:

FIG. 1 is a schematic view of my inching and braking control showing use thereof in connection with a vehicle power train and vehicle braking system; and FIG. 2 is a pictorial view illustrating the lever and pedal mechanism of my invention.

In FIG. 1, I show the components of the motor vehicle with which my invention is directly related. As shown, a prime mover in the form of an internal combustion engine 11 is connected to a power train including a torque converter 12 and a power shifted forward-reverse transmission 13 having an output shaft 14. The engine 11 drives a hydraulic pump 16 which supplies pressure fluid to valve means 17 through conduit 18. The valve means 17 is connected by passages 22, 23 to forward and reverse clutches 19, 21 of transmission 13. The valve means 17 includes a housing 26 in which flow control elements or spools 27, 28 are disposed in suitable bores. The flow control element 28 has a stem portion 29 which is connected to control mechanism, not shown, for manual operation by the vehicle operator. Return to reservoir passages 32, 33 and 34 are connected to a hydraulic reservoir, not shown, from which the pump 16 draws fluid.

Referring also to FIG. 2, my clutch and brake control includes a lever and pedal mechanism or assembly 41. Assembly 41 includes a lever 42 which is pivotally connected to the chassis 43 of the vehicle by a pin 44 for rotation about a transverse axis 46 and a pedal 61 pivotally connected to lever 42 on a transverse axis 62. The lever 42 has a depending portion 47 which is connected to a linkage 48 for operating a master cylinder 49.

The vehicle is provided with a fluid pressure wheel brake system or brake means including wheel brakes 51 operated by wheel cylinders 52 and delivery means for selectively supplying pressure fluid to the wheel brakes including master cylinder 49 and fluid pressure conduits 53, 54, 55. The pedal 61 includes a first part 63 which is elongated in a longitudinal direction and adapted to be engaged by the operator's left foot so that he may selectively (1) pivot the pedal 61 about axis 62 to declutch only, (2) pivot the lever 42 about axis 46 without relative pivoting movement between the pedal 61 and the lever 62 to brake only, or (3) pivot the lever 42 about axis 46 and simultaneously pivot the pedal 61 about axis 62 to achieve inching. Operating means 66 are provided for shifting the control valve element 27 in response to relative rotation between the pedal 61 and the lever 42. The operating means 66 includes a motion transmitting mechanism in the form of a Bowden wire. The Bowden wire includes a motion transmitting component in the form of a wire 68 having one end thereof connected to the bottom rear end of part 63 of the pedal 61 and having its other end pivotally connected by a pin 69 to a stem portion 31 of the flow control element 27. The Bowden wire also includes a sheathing 71 for the wire 68, which is secured at one end by a clamp 72 against movement relative to the lever 42 and is connected by clamp means 73 against movement relative to the valve housing 26.

The pedal 61 also includes a second part 76 extending transversely of part 63 in the direction of axis 62. The part 76 is disposed so that when the operator engages his foot therewith and presses downwardly the lever 42 pivots about its axis 46, but the pedal 61 does not pivot relative to the lever 42, thus when the operator applies foot pressure to part 76, only the vehicle brakes are operated and the power train is not disengaged inasmuch as no relative pivoting is produced between pedal 61 and lever 42. The pedal 61 is resiliently biased by a spring 77, operatively interposed between the part 63 and lever 42, to the position illustrated wherein the forward part of the pedal 61 abuts adjustable stops 78. In this relative position of pedal 61 and lever 42 the wire 68 pulls the flow control element 27 to the right to the position illustrated in FIG. 1 and in this position fluid under pressure from the pump is delivered to the control valve spool 28. When the operator depresses his left heel pivoting pedal 61 relative to the lever 42, the wire 68 will shift the valve element 27 to the left thereby connecting conduit 18 to conduit 32 and dumping the clutch actuating pressure fluid. When this occurs the engaged clutch is disengaged by the reduced fluid pressure thereby interrupting the power train. The brake shoe backup springs 81 and pedal spring 77 may have spring rates which permit the operator to pivot the pedal 61 about axis 62 to disengage the clutch without applying the wheel brakes.

A particularly important aspect of my combined clutch and brake control is the fact that the left foot can be used, by rocking it about the ankle, as the means for selecting the proper degree of clutch disengagement and wheel braking. Prior clutching and braking pedal arrangements could be adjusted for a particular overlap of clutching and braking and if a different overlap was desired, mechanical adjustment of the interengagement of the pedals or their associated operating linkage was required. The particular clutching and braking overlap in prior art devices was necessarily a compromise since the amount of clutch engagement and braking during inching operations should ideally change with vehicle load, operating slope and the like. Also wear of the friction facing of the clutch and brake necessitated mechanical adjustment of the prior art inching control in order to maintain the predetermined desired overlap of clutching and braking. To compensate for such wear in my invention the operator need only pivot his left foot slightly at the ankle and the operator will make such adjustment of his foot almost unconsciously as he selects the appropriate overlap of clutching and braking to achieve the desired inching of the vehicle under various loads and inclined slope operating conditions.

The embodiments of the invention for which an exclusive property or privilege is claimed are defined as follows:

A clutching and braking control for a motor vehicle comprising:
- a power train including
  - a clutch actuated by fluid pressure and
  - a fluid control valve for said clutch,
- a fluid pressure wheel brake system including
  - wheel brakes and
  - delivery means for selectively supplying pressure fluid to said wheel brakes,
- a brake lever pivotally mounted on said vehicle on a first transverse axis and connected to said delivery means for operating the latter,
- a pedal,
- means pivotally mounting said pedal on said lever on a second transverse axis spaced from said first axis and intermediate longitudinally opposite ends of said pedal,
- a stop on said lever on the side of said second axis remote from said first axis and engageable with said pedal to limit pivoting of the latter in one direction about said second axis beyond a predetermined position relative to said lever, biasing means interposed between said pedal and lever urging said pedal toward said position,
- a first part on said pedal elongated in a longitudinal direction and adapted to be engaged by the foot of the vehicle operator to selectively
  - pivot said pedal relative to said lever without pivoting said lever about said first axis,
  - pivot said lever about said first axis without pivoting said pedal relative to said lever and
  - simultaneously pivot said pedal relative to said lever and said lever about said first axis,
- a second part on said pedal extending transversely from the portion of said first part remote from said first axis and adapted for engagement by the operator's foot to only pivot said lever about said first axis without pivoting said pedal relative to said lever, and
- means for operating said control valve in response to relative rotation between said pedal and lever in opposition to said biasing means.

References Cited by the Examiner

UNITED STATES PATENTS

| | | | |
|---|---|---|---|
| 1,908,214 | 5/1933 | Arbuckle et al. | |
| 1,938,914 | 12/1933 | Kress | 192—13 X |
| 2,002,511 | 5/1935 | Sanford | 192—13 X |
| 2,085,550 | 6/1937 | Staude | 192—13 X |
| 2,836,990 | 6/1958 | Heer. | |

DAVID J. WILLIAMOWSKY, *Primary Examiner.*

BENJAMIN W. WYCHE III, *Examiner.*